(12) United States Patent
Liepold et al.

(10) Patent No.: US 12,122,223 B2
(45) Date of Patent: Oct. 22, 2024

(54) VEHICLE

(71) Applicant: Audi AG, Ingolstadt (DE)

(72) Inventors: Thomas Liepold, Gaimersheim (DE); Frank Mauersberger, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/820,754

(22) Filed: Aug. 18, 2022

(65) Prior Publication Data

US 2023/0058642 A1 Feb. 23, 2023

(30) Foreign Application Priority Data

Aug. 19, 2021 (DE) ...................... 10 2021 121 532.3

(51) Int. Cl.
*B60J 5/04* (2006.01)

(52) U.S. Cl.
CPC ............ *B60J 5/0479* (2013.01); *B60J 5/0458* (2013.01)

(58) Field of Classification Search
CPC ....................................................... B60J 10/84
USPC ......... 296/146.9, 146.11, 146.6, 187.12, 202, 296/155; 49/502
See application file for complete search history.

(56) References Cited

U.S. PATENT DOCUMENTS

| | | | | |
|---|---|---|---|---|
| 3,819,228 A * | 6/1974 | Cornacchia | ............ | B62D 25/04 292/DIG. 65 |
| 4,135,760 A * | 1/1979 | Grossbach | .......... | E05D 15/1081 296/155 |
| 4,307,911 A * | 12/1981 | Pavlik | .................. | B62D 25/025 296/187.12 |
| 4,544,198 A * | 10/1985 | Ochiai | ....................... | B60J 5/06 296/155 |
| 5,782,523 A | 7/1998 | Heldt et al. | | |
| 6,332,641 B1 | 12/2001 | Okana | | |
| 6,382,705 B1 * | 5/2002 | Lang | .......................... | B60J 5/06 49/248 |
| 6,749,253 B1 * | 6/2004 | Zummallen | ............ | B60J 5/0458 296/187.12 |

(Continued)

FOREIGN PATENT DOCUMENTS

DE 102007063540 A1 7/2009
DE 102018108378 A1 10/2018

(Continued)

OTHER PUBLICATIONS

European Application No. 22185635.4, Office Action mailed Dec. 7, 2022; 8 pages.

*Primary Examiner* — Amy R Weisberg
*Assistant Examiner* — Veronica M Shull
(74) *Attorney, Agent, or Firm* — Sterne, Kessler, Goldstein & Fox P.L.L.C.

(57) ABSTRACT

The present disclosure relates to a vehicle having a body, a first vehicle door, and a second vehicle door arranged behind the first vehicle door in a vehicle longitudinal direction. The first and second vehicle doors are each movably coupled to the body such that the first and second vehicle doors are movable between a closed position and an open position in a sliding-pivoting manner. The vehicle includes at least one passive locking device that interlockingly connects one of the first and second vehicle doors to the body of the vehicle when set at the closed position to form a vehicle pillar of the body of the vehicle.

15 Claims, 2 Drawing Sheets

(56) References Cited

U.S. PATENT DOCUMENTS

| | | | | |
|---|---|---|---|---|
| 8,870,263 | B2* | 10/2014 | Choi | B60J 5/043 |
| | | | | 49/169 |
| 9,849,759 | B2* | 12/2017 | Lovelace | E06B 3/362 |
| 10,000,948 | B2* | 6/2018 | Hamdoon | B60J 5/0458 |
| 10,384,519 | B1* | 8/2019 | Brown | B60J 5/047 |
| 10,443,282 | B2* | 10/2019 | Bauer | E05D 15/1047 |
| 10,960,739 | B2* | 3/2021 | Choi | B60J 5/043 |
| 11,446,989 | B1* | 9/2022 | Brown | E05D 15/1005 |
| 11,525,293 | B2* | 12/2022 | Yun | E05D 15/0621 |
| 2005/0146159 | A1* | 7/2005 | Shen | E05D 15/34 |
| | | | | 296/155 |
| 2009/0051194 | A1 | 2/2009 | Elliott et al. | |
| 2018/0298647 | A1 | 10/2018 | Baskar et al. | |
| 2020/0338974 | A1* | 10/2020 | Lee | B60J 10/86 |
| 2020/0398650 | A1 | 12/2020 | Yun | |
| 2022/0410674 | A1* | 12/2022 | Kanasugi | B60J 5/0479 |

FOREIGN PATENT DOCUMENTS

| | | |
|---|---|---|
| DE | 102017008872 A1 | 3/2019 |
| DE | 102018204455 A1 | 9/2019 |
| EP | 1918140 A2 | 5/2008 |
| EP | 3587155 A1 | 1/2020 |

\* cited by examiner

VEHICLE

TECHNICAL FIELD

The present invention relates to a vehicle having a body and at least two vehicle doors arranged one behind the other in the vehicle longitudinal direction without a separating vehicle pillar, which can each be moved between a closed position and an open position.

BACKGROUND

Vehicles having at least two vehicle doors arranged one behind the other in the vehicle longitudinal direction without a separating vehicle pillar are known in numerous variations.

DE 10 2017 008 872 A1 discloses a motor vehicle having a door device which comprises a vehicle door, a guide link which at least partially delimits a guide path along which the vehicle door can be movably guided and which is arranged on the body of the motor vehicle, a first guide element movably coupled to the guide rail and coupled to a first door region of the vehicle door, and a second guide element rotatably coupled to the body of the motor vehicle and rotatably coupled to a second door region of the vehicle door. The first guide element has two element regions arranged at a distance from one another in the vehicle transverse direction of the motor vehicle, of which element regions a first element region is non-rotatably connected to the vehicle door and a second element region is movably coupled to the guide rail. The motor vehicle can be designed, for example, as a four-door convertible without B-pillars.

From DE 10 2018 108 378 A1, a vehicle having a center-opening door assembly mounted on a passenger compartment and an active latch mechanism for the center-opening door assembly is known. The center-opening door assembly includes a rear door panel mounted on a rear hinge and a front door panel mounted on a front hinge. This type of center-opening door assembly typically lacks a fixed hinge pillar by which the rear door panel mounted on a rear hinge could be supported in a closed configuration. Instead, the rear door panel mounted on a rear hinge is provided with an upper and a lower latch mechanism, each of which engaging in cooperating latches arranged on a vehicle roof frame and a sill. The front door panel mounted on a front hinge engages in a center-mounted latch arranged on the rear door panel mounted on a rear hinge. The upper latch mechanism is supported by a reinforcement plate and is mounted in an articulated manner to engage in a latch under the active control of an actuator, for example, a cable. For preventing vertical movements of the rear door panel mounted on the rear hinge relative to the front door panel mounted on a front hinge in a closed configuration during vehicle travel, a supplemental latch mechanism is used for the center-opening door assembly. The supplemental latch mechanism includes a pin associated with the front door panel mounted on the front hinge. The supplemental latch mechanism further includes a seat associated with the rear door panel mounted on the rear hinge. In this case, the pin and the interacting seat mesh to reduce or prevent a movement of the front door panel mounted on a front hinge perpendicular to the rear door panel mounted on a rear hinge.

SUMMARY

The problem addressed by the invention is that of providing a vehicle having a body and at least two vehicle doors arranged one behind the other in the vehicle longitudinal direction, which in the closed state improve the rigidity and load distribution of the vehicle body.

This problem is solved by a vehicle having the features of the claimed embodiments. Advantageous embodiments of the invention with additional developments are specified in the dependent claims.

In order to provide a vehicle having a body and at least two vehicle doors arranged one behind the other in the vehicle longitudinal direction, which in the closed state improve rigidity and load distribution of the vehicle body, at least one of the vehicle doors is designed to form a vehicle pillar of the body in a closed position. In this case, at least one passive locking device is designed to interlockingly connect the integrated vehicle pillar to the body in the closed state of the corresponding vehicle door. In addition, the at least two vehicle doors arranged one behind the other in the vehicle longitudinal direction are movably coupled to the body in a sliding-pivoting manner, so that they can be moved between the closed position and an open position.

In an advantageous embodiment of the vehicle, the at least one passive locking device can be designed to interlockingly connect the integrated vehicle pillar to a structural component of the body in the closed position. In this case, for example, a first passive locking device can be designed to interlockingly connect the integrated vehicle pillar to a first structural component designed as a roof frame in the closed position. A second passive locking device can be designed, for example, to interlockingly connect the integrated vehicle pillar to a second structural component designed as a sill in the closed position. With the vehicle pillar integrated in the vehicle door, the rigidity of the body in the region of the door cutout can be increased during driving when the vehicle doors are in the closed position and a corresponding load path can be provided between the roof frame and the sill, analogous to an existing B-pillar. However, in the open position of the vehicle doors, the space available for boarding and exiting can be significantly increased, since no B-pillar impedes boarding and exiting.

In a further advantageous embodiment of the vehicle, at least one first reinforcement element on a vertical frame portion of a first vehicle door and/or at least one second reinforcement element on a vertical frame portion of a second vehicle door can form the integrated vehicle pillar. The first vehicle door can be arranged behind the second vehicle door in the direction of travel. In this case, a first sliding-pivoting kinematics can movably mount the first vehicle door on a C-pillar of the body in a sliding-pivoting manner, and a second sliding-pivoting kinematics can movably mount the second vehicle door on an A-pillar of the body in a sliding-pivoting manner. For example, a front vertical frame portion of the first vehicle door facing the second vehicle door can be reinforced by the at least one first reinforcement element and form the vehicle pillar integrated into the first vehicle door. Alternatively, for example, a rear vertical frame portion of the second vehicle door facing the first vehicle door can be reinforced by the at least one second reinforcement element and form the vehicle pillar integrated into the second vehicle door. In a preferred embodiment, at least one first reinforcement element on the front vertical frame portion of the first vehicle door and at least one second reinforcement element on the rear vertical frame portion of the second vehicle door can jointly form the integrated vehicle pillar. As a result, the additional weight of the reinforcement elements can be distributed over the vehicle doors.

In a further advantageous embodiment of the vehicle, the at least one passive locking device can comprise a body-side receiving element and a door-side locking element. In this case, the door-side locking element can be designed to be inserted into the body-side receiving element by a pivoting movement of the corresponding vehicle door and interlockingly locked in the body-side receiving element by a locking sliding movement of the corresponding vehicle door. This allows for a particularly simple and cost-effective realization of the automatic interlocking locking of the integrated vehicle pillar to the body by the closing movement of the corresponding vehicle door.

In a further advantageous embodiment of the vehicle, the body-side receiving element can comprise a receiving opening and a locking opening. The body-side receiving element can be designed, for example, as a keyhole bore or as a link guide. The door-side locking element can be designed, for example, as a locking bolt. The locking bolt can be designed to be, for example, cylindrical or mushroom-shaped or dovetail-shaped. The receiving opening and the locking opening of the body-side receiving element can be adapted to the shape of the locking bolt such that, in the closed position, the locking bolt can mesh with the body-side receiving element in a bayonet-like manner.

The features and combinations of features mentioned above in the description, as well as the features and combinations of features mentioned below in the description of the figures and/or shown only in the figures, can be used not only in the respectively specified combination but also in other combinations or in isolation without departing from the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

Embodiments of the invention are shown in the drawing and will be explained in more detail in the following description. In the drawings, the same reference signs denote components or elements that perform the same or analogous functions. In the drawings.

DETAILED DESCRIPTION

Figure 1:
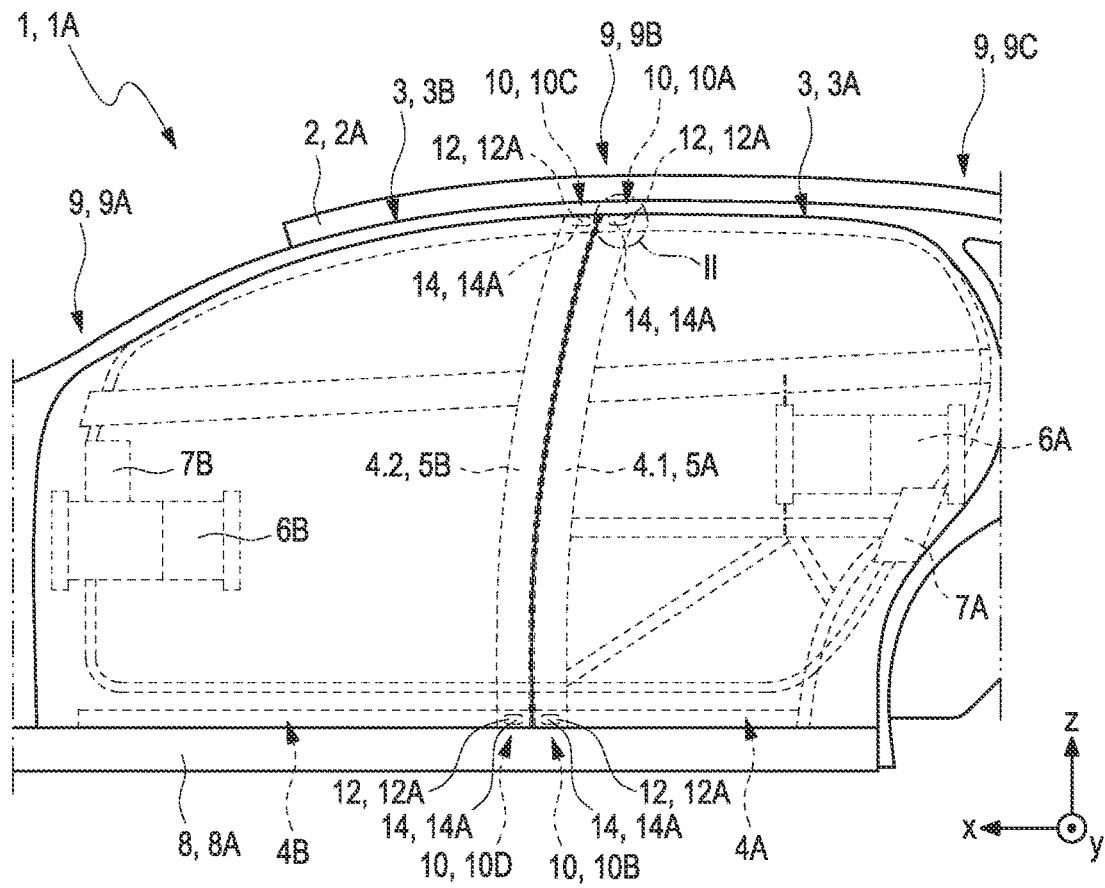
FIG. 1 shows a schematic and partial representation of a vehicle according to an embodiment of the invention.
Figure 2:
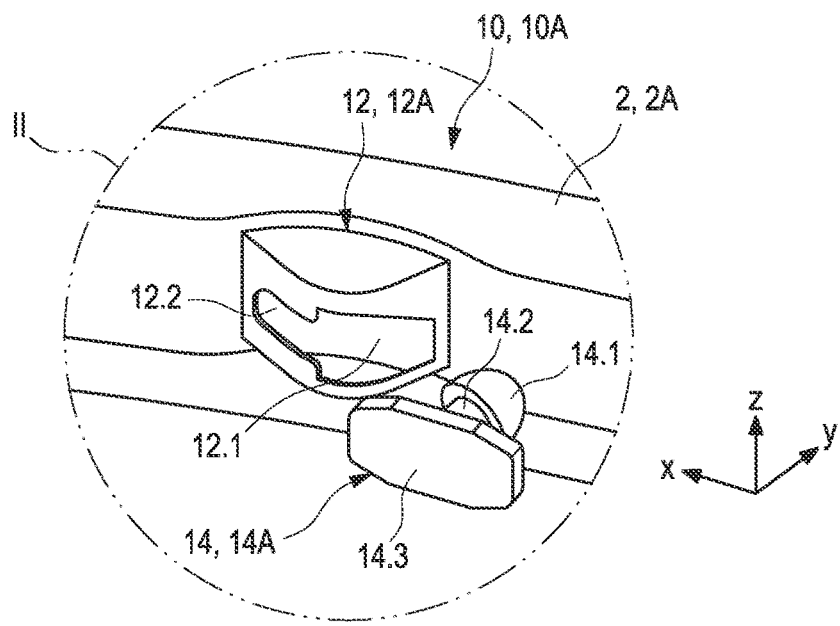
FIG. 2 shows a schematic and perspective representation of a detail II from FIG. 1, which shows a first embodiment of a passive locking device for the vehicle according to the embodiment of the invention shown in FIG. 1.
Figure 3:
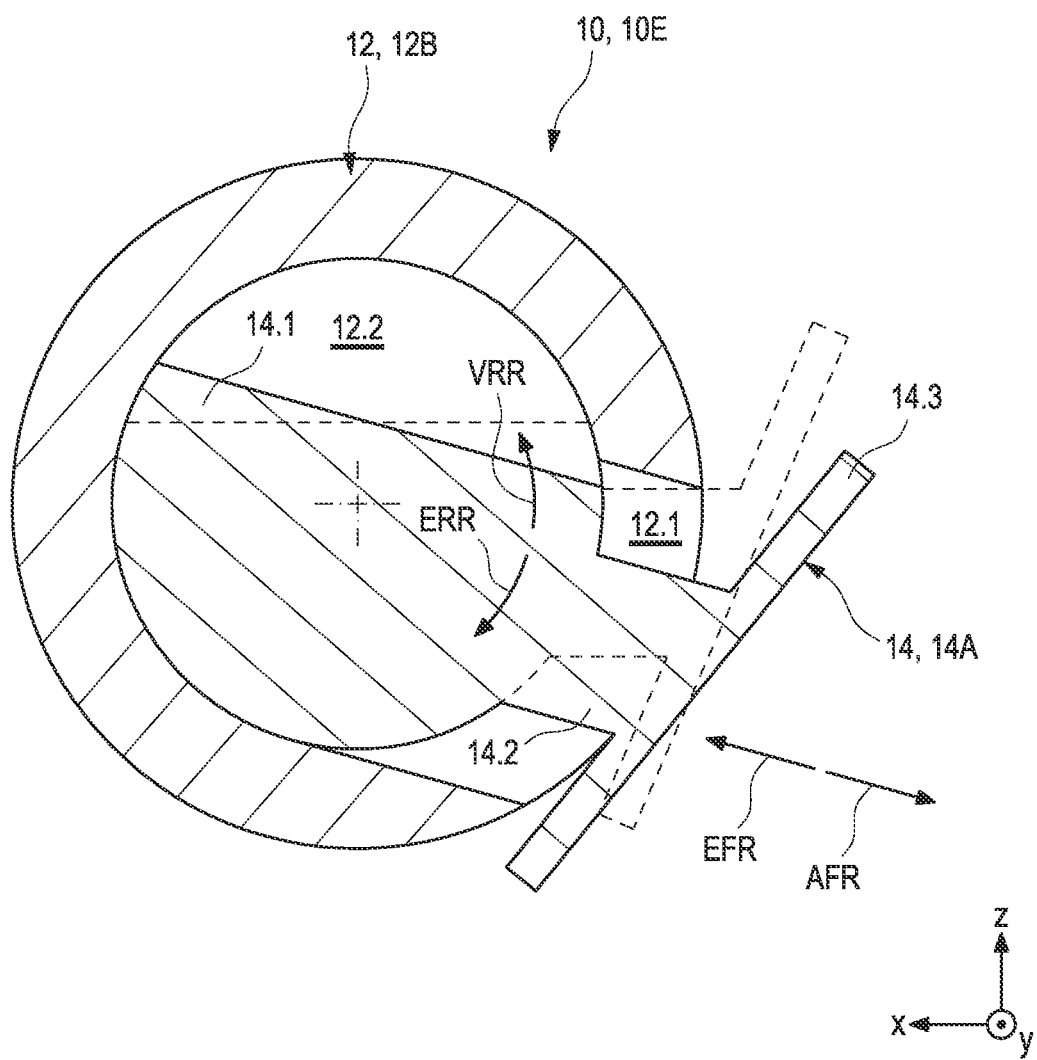
FIG. 3 is a schematic sectional view of a second embodiment of the passive locking device for the vehicle according to the embodiment of the invention shown in FIG. 1.

As can be seen from FIGS. 1 to 3, a vehicle 1 according to an illustrated embodiment of the invention comprises a body 1A and at least two vehicle doors 3, 3A, 3B arranged one behind the other in the vehicle longitudinal direction x, which can each be moved between a closed position and an open position and are movably coupled to the body 1A in a sliding-pivoting manner, and at least one passive locking device 10, 10A, 10B, 10C, 10D. At least one of the vehicle doors 3, 3A, 3B forms a vehicle pillar 9 of the body 1A in the closed position, wherein the at least one passive locking device 10, 10A, 10B, 10C, 10D interlockingly connects the integrated vehicle pillar 9 of the corresponding vehicle door 3, 3A, 3B to the body 1A in the closed position.

As can also be seen from FIG. 1, a vehicle door 3A is arranged behind a second vehicle door 3B in the direction of travel. In this case, the first vehicle door 3A comprises a continuous door frame 4A having a front vertical frame portion 4.1 which is reinforced by a ribbon-shaped first reinforcement element 5A. In addition, a first sliding-pivoting kinematics 6A movably mounts the first vehicle door 3A in a sliding-pivoting manner on a C-pillar 9C of the body 1A of the vehicle 1. The second vehicle door 3B is arranged in front of the first vehicle door 3A in the direction of travel and comprises a continuous door frame 4B having a rear vertical frame portion 4.2 which is reinforced by a ribbon-shaped second reinforcement element 5B. Furthermore, a second sliding-pivoting kinematics 6B movably mounts the second vehicle door 3B in a sliding-pivoting manner on an A-pillar 9A of the body 1A of the vehicle 1. As can also be seen from FIG. 1, the two vehicle doors 3A, 3B each comprise an electric door lock 7A, 7B. A first electric door lock 7A thus secures the first vehicle door 3A against unauthorized opening. A second electric door lock 7B secures the second vehicle door 3B against unauthorized opening.

As can also be seen from FIG. 1, in the depicted embodiment of the vehicle 1, the first reinforcement element 5A of the first vehicle door 3A and the second reinforcement element 5B of the second vehicle door 3B jointly form the integrated vehicle pillar 9 which in this case corresponds to a B-pillar 9B.

As can also be seen from FIG. 1, in the closed position, a first passive locking device 10A interlockingly connects a part of the integrated vehicle pillar 9 integrated into the first vehicle door 3A or the first reinforcement element 5A to a first structural component 2 designed as a roof frame 2A. In the closed position, a second passive locking device 10B interlockingly connects the part of the integrated vehicle pillar 9 integrated into the first vehicle door 3A or the first reinforcement element 5A to a second structural component 8 designed as a sill 8A. In addition, in the closed position, a third passive locking device 10C interlockingly connects a part of the integrated vehicle pillar 9 integrated into the second vehicle door 3B or the second reinforcement element 5B to the first structural component 2 designed as a roof frame 2A. In the closed position, a fourth passive locking device 10D interlockingly connects the part of the integrated vehicle pillar 9 integrated into the second vehicle door 3B or the second reinforcement element 5B to the second structural component 8 designed as a sill 8A.

In an alternative embodiment of the vehicle 1 (not depicted), only the first reinforcement element 5A of the first vehicle door 3A forms the integrated vehicle pillar 9. In this alternative embodiment, in the closed position, only the first reinforcement element 5A of the first vehicle door 3A is interlockingly connected to the roof frame 2A via the first passive locking device 10A and interlockingly connected to the sill 8A via the second passive locking device 10B.

In a further alternative embodiment of the vehicle 1 (not shown), only the second reinforcement element 5B of the second vehicle door 3B forms the integrated vehicle pillar 9. In this alternative embodiment, only the second reinforcement element 5B of the second vehicle door 3B is interlockingly connected to the roof frame 2A via the third passive locking device 10C and interlockingly connected to the sill 8A via the fourth passive locking device 10D in the closed position.

As can also be seen from FIGS. 1 to 3, the passive locking devices 10, 10A, 10B, 10C, 10D each comprise a body-side receiving element 12 and a door-side locking element 14. In this case, the door-side locking element 14 is inserted into the body-side receiving element 12 by a pivoting movement of the corresponding vehicle door 3 and interlockingly locked in the body-side receiving element 12 by a locking sliding movement of the corresponding vehicle door 3. For this purpose, the body-side receiving element 12 comprises a receiving opening 12.1 and a locking opening 12.2.

As can also be seen from FIG. 2, the body-side receiving element 12 in the depicted embodiment of the first passive locking device 10A is designed as a keyhole bore 12A having a larger receiving opening 12.1 and a smaller locking opening 12.2 and is arranged on the roof frame 2A. The door-side locking element 14 is designed as a mushroom-shaped locking bolt 14A having a wider bolt head 14.1 and a narrower bolt shaft 14.2 which is arranged on a base plate 14.3. The mushroom-shaped locking bolt 14A in the embodiment shown is inserted into the receiving opening 12.1 by a combined pivoting movement in the vehicle longitudinal direction x and the vehicle transverse direction y and locked in the locking opening 12.2 by the subsequent sliding movement in the vehicle longitudinal direction x. In contrast to the first passive locking device 10A, the body-side receiving element 12 of the second passive locking device 10B is arranged on the sill 8A. The third passive locking device 10C is designed mirrored to the first passive locking device 10A, and the fourth passive locking device 10D is designed mirrored to the second passive locking device 10B.

As can also be seen from FIG. 3, the body-side receiving element 12 in the depicted fifth embodiment of the passive locking device 10E is designed as a link guide 12B with a receiving opening 12.1 and a locking opening 12.2. The door-side locking element 14 is designed as a mushroom-shaped locking bolt 14A having a wider bolt head 14.1 and a narrower bolt shaft 14.2 which is arranged on a base plate 14.3.

In the embodiment shown, the mushroom-shaped locking bolt 14A is inserted into the receiving opening 12.1 by a combined pivoting movement in the vehicle longitudinal direction x and the vehicle transverse direction y in a predetermined insertion direction EFR and rotated about an axis of rotation by a subsequent sliding movement in the vehicle transverse direction y corresponding to a locking direction VRR and thus locked in the locking opening 12.2, as shown by the dashed representation of the locking bolt 14A. Since the receiving opening 12.1 and the locking opening 12.2 of the body-side receiving element 12 are adapted to the shape of the locking bolt 14A, the locking bolt 14A meshes in a bayonet-like manner with the body-side receiving element 12 in the closed position. When the corresponding vehicle door 3 is opened, the locking bolt 14A in the locking opening is first rotated in an opposite unlocking direction ERR and then guided out of the receiving opening 12.1 in an opposite retraction direction AFR.

Alternatively, the locking bolt 14A can be designed to be cylindrical or dovetail-shaped.

LIST OF REFERENCE SIGNS

1 Vehicle
1A Body
2 First structural component
2A Roof frame
3, 3A, 3B Vehicle door
4A, 4B Door frame
4.1, 4.2 Frame portion
5A, 5B Reinforcement element
6A, 6B Sliding-pivoting kinematics
7A, 7B Electric door lock
8 Second structural component
8A Sill
9 Vehicle pillar
9A A-pillar
9B B-pillar
9C C-pillar
10, 10A, 10B Locking device
12 Receiving element
12A Keyhole bore
12B Link guide
12.1 Receiving opening
12.2 Locking opening
14 Locking element
14A Mushroom-shaped locking bolt
14.1 Bolt head
14.2 Bolt shaft
14.3 Base plate
EFR Insertion direction
AFR Retraction direction
VRR Locking direction
ERR Unlocking direction

The invention claimed is:

1. A vehicle comprising:
 a body;
 a first vehicle door and a second vehicle door, wherein the first vehicle door is arranged behind the second vehicle door in a vehicle longitudinal direction, and the first and second vehicle doors are each movably coupled to the body of the vehicle such that the first and second vehicle doors are configured to move between a closed position and an open position; and
 a passive locking device configured to interlockingly connect one of the first and second vehicle doors to the body of the vehicle when set at the closed position;
 a first sliding-pivoting kinematics configured to movably mount the first vehicle door on a C-pillar of the body in a sliding-pivoting manner; and
 a second sliding pivoting kinematics configured to movably mount the second vehicle door on an A-pillar of the body in a sliding-pivoting manner,
 wherein at least one of the first and second vehicle doors is configured to form a vehicle pillar of the body when set in the closed position and interlockingly connected to a frame of the body by the passive locking device.

2. The vehicle according to claim 1, wherein the passive locking device is configured to interlockingly connect the one of the first and second vehicle doors to a structural component of the body when the one of the first and second vehicle doors is set in the closed position to form the vehicle pillar.

3. The vehicle according to claim 2, wherein the passive locking device includes:
 a first passive locking device configured to interlockingly connect the one of the first and second vehicle doors to a first structural component that is a roof frame when the one of the first and second vehicle doors is set in the closed position to form the vehicle pillar;
 a second passive locking device configured to interlockingly connect the one of the first and second vehicle doors to a second structural component that is a sill when the one of the first and second vehicle doors is set in the closed position to form the vehicle pillar.

4. The vehicle according to claim 1, further comprising:
a first reinforcement element disposed on a vertical frame portion of the first vehicle door.

5. The vehicle according to claim 4, further comprising:
a second reinforcement element on a vertical frame portion of the second vehicle door.

6. The vehicle according to claim 4, wherein at least one of the first sliding-pivoting kinematics or the second sliding-pivoting kinematics is further configured to pivot followed by sliding for closing of the first vehicle door or the second vehicle door.

7. The vehicle according to claim 1, wherein the passive locking device comprises:
a body-side receiving element disposed on the body of the vehicle; and
a door-side locking element disposed on the one of the first and second vehicle doors.

8. The vehicle according to claim 7, wherein the door-side locking element is configured to be inserted into the body-side receiving element by a pivoting movement of the one of the first and second vehicle doors and interlockingly locked in the body-side receiving element by a locking sliding movement of the one of the first and second vehicle doors.

9. The vehicle according to claim 7, wherein the body-side receiving element comprises a receiving opening and a locking opening.

10. The vehicle according to claim 7, wherein the body-side receiving element comprises a keyhole bore or a link guide.

11. The vehicle according to claim 7, wherein the door-side locking element comprises a locking bolt.

12. The vehicle according to claim 11, wherein the locking bolt is cylindrical-shaped, mushroom-shaped, or dovetail-shaped.

13. The vehicle according to claim 9, wherein a shape of the receiving opening and a shape of the locking opening are adapted to a shape of a locking bolt such that, when the one of the first and second vehicle doors is set in the closed position, the locking bolt is configured to interface with the body-side receiving element as a bayonet-like lock.

14. The vehicle according to claim 1, wherein a pivoting axis of the first sliding-pivoting kinematics is distal from an interface between the first vehicle door and the second vehicle door.

15. The vehicle according to claim 1, wherein a pivoting axis of the second sliding-pivoting kinematics is distal from an interface between the first vehicle door and the second vehicle door.

* * * * *